3,202,585
HIGH TEMPERATURE NIOBIUM-UO₂ NUCLEAR FUEL SHEET

Harry P. Kling, Baltimore, Md., and Lawrence Sama and Seymour Priceman, Seaford, Bernard Brodwin, Brooklyn, and Abraham Eiss, New Rochelle, N.Y., assignors to the United States of America as represented by the United States Atomic Energy Commission
No Drawing. Filed Nov. 2, 1959, Ser. No. 850,490
6 Claims. (Cl. 176—69)

The present invention relates generally to nuclear reactor fuel elements, and in particular to one which has both high strength and high oxidation resistance at elevated temperatures.

It is the object of this invention to provide such a fuel element capable of operating in air at temperatures in excess of 2100° F. for at least 100 hours with little deformation under stresses of the order of 1000 to 1500 p.s.i. Such a fuel element must also be characterized by a low neutron capture cross section, good fabricability and low diffusion migration of fuel to the surface of the fuel element.

The foregoing objectives have been achieved by a process wherein a strong core of niobium-$UO_2$ or niobium alloy-$UO_2$ is clad with an easily fabricable alloy of niobium-titanium or niobium-titanium-aluminum. Use of this cladding enables the composite to be cold rolled 90% or more of its original thickness. Although the cladding alloys are greatly superior in oxidation resistance to the core material, further protection is necessary for exposure to service conditions in air at about 2200° F. The composite is therefore coated with aluminum or certain aluminum base alloys. This is accomplished by dipping the clad core in a molten bath. After a suitable diffusion treatment the composite is ready for service. At this completed stage the outer surface layers consist of oxidation resistant intermetallic compounds, the intermediate layer is a soft niobium alloy-$UO_2$ composite. The various components are most compatible and the composite is quite strong and oxidation resistant in air to at least 2200° F. for 100 hours. Moreover there is very little migration of uranium to the surface of the composite after the required 100 hours exposure at temperature, and the total neutron cross section is low, since the composite has a niobium core and the cladding does not contain sufficient titanium to raise the total cross section above a desirable figure.

The present invention may be more fully understood by the following detailed discussion of the several steps:

PREPARATION OF THE CORE MATERIAL

The core material is made by first weighing and blending −325 mesh powders in the desired proportion of 30 w/o $UO_2$ with the balance niobium. The mixture is compacted in a steel die at 50 t.s.i. and is vacuum sintered at 2000° C. for two hours.

In place of pure niobium, the composition of the core may be modified for increased strength by additions of molybdenum, chromium or titanium. For example, in place of pure niobium, one may substitute a mixture of niobium-5 a/o molybdenum, or niobium-5 a/o molybdenum-2 a/o titanium. In this way core properties such as strength and oxidation resistance are improved readily without deleterious effects other than a slight increase in neutron capture cross section.

The sintered cores made as described can then be sized by a small amount of cold rolling approximately 10–20% to the desired thickness. The core is then trimmed and beveled to minimize "dog-boning" during later fabrication by rolling. The core is finally resintered at 2000° C. for ½ hour.

PREPARATION OF THE CLADDING MATERIAL

The cladding alloys of niobuim-titanium are prepared by vacuum arc melting by conventional techniques. Briefly stated, a consumable electrode is prepared by surrounding a niobium rod with a titanium tube. The electrode is mounted in an arc furnace and the system pumped down to a pressure of about 10 microns. The system is then flushed with argon. A final argon pressure is held at 20 inches of mercury for the melting operation. To establish an arc the electrode is struck against a rolled button of niobium-40 a/o titanium alloy placed in the base of the mold. The electrode is hand fed, the arc being kept as short as possible. During this operation the current exceeds 1400 amps, while the voltage varies between 12 and 18. Satisfactory ingots of niobium-40 a/o titanium are prepared in this manner.

Next, the alloy ingot is cold rolled to a thickness of 0.144", X-rayed and vacuum annealed at 1000° C. for ½ hour.

Besides the foregoing alloy of niobium-40 a/o titanium, other niobium-titanium binary and ternary alloys are suitable. Compositions may vary from 25–75 a/o titanium and 0–20 a/o aluminum. It has been found that the binary alloy, niobium-40 a/o titanium, and the ternary alloy, niobium-40 a/o titanium-15 a/o aluminum are especially attractive. In particular, the addition of aluminum improves the resistance of the composite to cyclic oxidation. All of the foregoing alloys provide a compatible niobium-base inner coating which permits the composite element to be cold rolled to ribbon form as thin as 0.020" and at the same time provides a necessary base for the aluminum coating which is subsequently applied to secure the oxidation resistance required in service operation.

CLADDING THE CORE

The core material is next clad by the conventional picture frame technique. (See H. M. Finniston and J. P. Howe, "Progress in Nuclear Energy, Series V; Metallurgy and Fuels," McGraw-Hill, 1956.) The core material is machined to fit picture frames which are punched from sheets of cladding material. The core is inserted in the frames, cladding sheets are placed top and bottom, and the entire assembly spot welded.

The assembly is next vacuum annealed at 1000° C. for ½ hour, vacuum hot pressed at 1200° C. for ¼ hour at 4 t.s.i., then cold rolled to 0.020" thickness. Care must be exercised in the hot pressing step to prevent surface hardening of the clad. This will occur if the customary alumina die parting compounds are used and will cause the composite to crack when cold rolled. This problem may be avoided by pressing the composite between molybdenum dies coated with aquadag.

In the hot pressing operation care must be exercised to assure that the pressure is sufficient to produce a good bond but not so high as to cause the core material to extrude from the assembly. Experience has shown that assemblies hot pressed at 1.8 t.s.i. tended to separate during subsequent cold rolling, whereas pressures of about 2.5 to 4 t.s.i. seemed adequate for good results. On the other hand pressure of 4.5 t.s.i. resulted in some extrusion of the core material.

Following cold rolling to 0.020", the ribbon is vacuum annealed at 1000° C. for ½ hour. The ribbon at this stage consists of a 0.012" niobium-$UO_2$ core with 0.004" of alloy cladding on each side. Relative proportions of core and clad thickness can be varied by varying the original thickness of the several layers.

After annealing, the ribbon can be cold formed to any desired shape, since it is quite ductile and the compounds are compatible. It is emphasized that no brittle intermetallics are formed between the niobium-titanium cladding material and the niobium base core material during any stage of preparation and heat treatment.

COATING THE CLAD COMPOSITE

Further processing is required to coat the finished composite with aluminum or aluminum alloy. The corners and edges of the composite are mechanically rounded slightly by abrasion. This has been found to be highly desirable if a thick uniform aluminum coating is to be secured at the edges. The surface is then sandblasted and rinsed in an organic solvent. The composite is now ready for coating by dipping in a bath of aluminum or an alloy of aluminum-11 w/o silicon maintained at a dipping temperature of about 1650° F. to 1700° F. The time is adjusted from one to two minutes to obtain aluminum or aluminum alloy coatings 0.002 inch in thickness. The coating thickness can be controlled by varying the time and temperature of dipping. A thickness of 0.0015" to 0.002" has been found to be sufficient.

Samples can be dipped at temperatures of 1400° F. and 1500° F., but at these temperatures the coating is thinner, and overall oxidation resistance is lowered. Alternatively, samples dipped at high temperatures and for periods of more than 2 minutes showed an increase in the intermetallic layer but some of the starting sample is eroded away and dissolved in the dipping bath. For example, at 1900° F. and 4 minutes most of the intermetallic sub-layer is completely dissolved. Hence, a dipping temperature of 1650° F. to 1700° F. and a dipping time of 2 minutes is used for coating the clad composite article.

After dipping, the composite can be quite roughly handled and submitted to service conditions. It may even be further bent or formed without damage. However, it is preferable to give the coating a diffusion treatment of one hour in argon at a temperature of 1900° F. Good results have been obtained by using a calorizing mix to surround the composite during the diffusion treatment. The resultant outer coating is a composite of layers of oxidation resistant ternary intermetallic compounds.

TESTING

Composite articles made by the foregoing method have been successfully subjected to stress and oxidizing conditions for 100 hours at 2200° F. with little attack from the environment. After 100 hours under a stress of 1000 p.s.i. one sample containing a niobium-$UO_2$ core elongated only 2.6%. With 1500 p.s.i. a similar sample elongated 3.7%, well within permissible tolerances for service conditions. In the foregoing tests, oxide penetration of the samples amounted to less than 0.001". Higher stresses have been applied for even longer periods without serious deterioration of the coatings. One sample was run for over 200 hours at 2200° F. with a stress of 2800 p.s.i. and was still in good condition after testing. All of the foregoing samples consisted of Nb-30 w/o $UO_2$ cores clad with Nb-40 a/o titanium and dipped in aluminum at a temperature of 1650° F. for 1 minute followed by a diffusion treatment at 1900° F. for 1 hour in argon, the samples being immersed in a calorizing mix during the diffusion treatment.

Additional samples prepared by the foregoing technique with enriched $UO_2$ were subjected to oxidizing conditions at 2200° F. for 100 hours. Radioactivity at the sample surfaces was measured periodically and showed only negligible diffusion of uranium to the surface. These tests were conducted on four samples of Nb-30 w/o $UO_2$ (enriched), two of the samples being clad with Nb-40 a/o Ti and two with Nb-40 a/o Ti-15 a/o Al. All were aluminum dipped and diffused by standard methods. Both surfaces of each sample were alpha counted as fabricated and after oxidation periods ranging from one to 100 hours at 2200° F. in air. It was found that in no case did the count approach 300 counts per square inch per minute, equal to 1 p.p.m. of $U^{235}$ at the surface. In fact for two of the samples, the alpha counts were fewer than 10 per square inch per minute.

Examples

For testing in a burner rig, four fuel elements were constructed, each consisting of two stages supported in a linearly spaced relationship. Each stage consisted of three co-axial rings of fueled and unfueled material made in accordance with this invention. The rings were made as follows:

(1) *Preparation of the core material.*—Niobium, niobium alloy, and niobium-$UO_2$ powders (−325 mesh) were weighed, and blended; then compacted at 50 t.s.i., vacuum sintered at 2000° C. for 2 hours, rolled 10–20% to thickness desired, machined to fit picture frames, and re-sintered at 2000° C. for ½ hour.

(2) *Preparation of cladding material.*—Niobium-40 a/o titanium was prepared by arc melting. The alloy was then cold rolled to 0.144" thick, X-rayed, vacuum annealed at 1000° C. for ½ hour, cold rolled to picture frame and cladding thickness, and the picture frames were punched out.

(3) *Cladding the core material.*—The picture frames and cores were assembled and spot welded. The assembly was then vacuum annealed at 1000° C. for ½ hour, vacuum hot pressed at 1200° C. for ¼ hour at 4 t.s.i., cold rolled to 0.020" thick, X-rayed, again vacuum annealed at 1000° C. for ½ hour, trimmed, formed into rings and welded. Finally, the rings were vacuum stretched at 1000° C. for ½ hour to remove distortion.

(4) *Final assembly.*—The rings were then assembled into stages by welding to suitable spacers of niobium-40 a/o titanium. The stages were finally sandblasted and dipped in aluminum or aluminum-11 w/o silicon at 1700° F. for 2 minutes. This was followed by a diffusion treatment in a calorizing mix at 1900° F. for 1 hour in argon. The assembly was finally preoxidized in air for 1 hour at 2200° F.

The samples made in the foregoing manner are listed on the attached table:

IDENTIFICATION OF BURNER RIG SAMPLES

[All samples two stages with three rings in each stage. Nb-40 a/o Ti cladding used throughout]

| Sample No. | 1 | 2 | 3 | 4 |
|---|---|---|---|---|
| Composition: | | | | |
| First stage cores | Nb-30 w/o $UO_2$a | Nb-5 a/o Zrb | Nb-5 a/o Zrb | Nb-5 a/o Mo-5 a/o Zr.b |
| Second stage cores | Nb-30 w/o $UO_2$a | (Nb-5 a/o Mo)—30 w/o $UO_2$a | (Nb-5 a/o Mo)—$UO_2$a | (Nb-5 a/o—2 a/o Ti)—30 w/o $UO_2$a. |
| Core thickness, inches | 0.010 | 0.010 | 0.010 | 0.012. |
| Clad thickness, inches | 0.005 | 0.005 | 0.005 | 0.004. |
| Dipping bath composition. | Al-11 w/o Si | Al-11 w/o Si | Pure aluminum | Al-11 w/o Si. |
| Calorizing mix composition. | 10 w/o aluminum | 10 w/o aluminum | 10 w/o aluminum | 10 w/o (Al-11 w/o Si). |
| Pre-oxidation treatment. | None | 2200° F.—1 hour | 2200° F.—1 hour | 2200° F.—1 hour. | aSintered.   bArc-melted.

Tests of the foregoing samples were made in a burner rig at temperatures ranging from 1800° F. to 2200° F. The dynamic pressure head in the rig varied from 6 to 12 p.s.i., the Mach number from 0.5 to 0.9 and the time from from one to six hours. The tests demonstrated that the protective coating is both adherent and ductile at high temperature, since the superior oxidation resistance of the samples was retained notwithstanding that the rings were in some cases severely distorted. The following data for the testing of sample 4 is illustrative:

BURNER RIG TESTS ON SAMPLE 4

| Run No. | Temp., °F. | Dynamic head, p.s.i. | Mach No. | Time, hr. |
|---|---|---|---|---|
| 1 | 2,200 | 7.5 | 0.63 | 3 |
| 2 | 2,200 | 7.5 | 0.63 | 6 |

Examination of the sample revealed general distortion of that the upper halves of the rings were flattened approximately 1/32 inch while the lower halves were still essentially round. No evidence of oxidation was noted anywhere on the sample.

By means of this invention a sheet material is provided for the construction of nuclear fuel elements of any desired configuration. The material is ductile and readily rolled, formed, cut and welded. Diffusion of uranium to the surface of the sheet is kept to low tolerances and the sheet is both strong and oxidation resistant when exposed to air at 2200° F. for 100 hours. Moreover, the sheet has a low total neutron capture cross-section since the titanium content of the core and cladding is kept at a minimum. The advantages of this invention are realized by the provision of the intermediate alloy layer between the core and the aluminum coating. This layer, being a niobium alloy, is compatible with the core and at the same time it is a superior base for the aluminum outer coating. In this respect, the niobium alloy is far superior to pure niobium.

We claim:

1. The method of making a nuclear fuel element in the form of a ribbon characterized by excellent strength and oxidation resistance in air at high temperature that consists in preparing a core comprising enriched uranium dioxide in a matrix of a metal selected from the group consisting of niobium, niobium-molybdenum and niobium-molybdenum-titanium, cladding the core with an alloy selected from the class consisting of niobium-titanium, and niobium-titanium-aluminum alloys, and dipping the clad core in a molten metal bath selected from the group consisting of aluminum and aluminum-11 w/o silicon.

2. The method of claim 1 wherein the dipped clad core is subjected to a diffusion treatment in an inert gas at a temperature of about 1900° F. for 1 hour.

3. The method of claim 1 wherein the core is prepared by blending the $UO_2$ and matrix in powder form, compacting the blended powder at a pressure of approximately 50 t.s.i. and sintering the compact at 2000° C. for approximately 2 hours.

4. The method of claim 1 wherein the core is clad by hot pressing at approximately 1200° C. for ¼ hour at a pressure of 2.5 to 4 t.s.i.

5. The method of claim 1 wherein the molten metal bath is maintained at a temperature of 1650° to 1700° F. and the dipping time is from 1 to 2 minutes.

6. A nuclear fuel sheet, consisting of a core comprising 30 w/o $U^{235}O_2$ in a matrix of a metal selected from the group consisting of niobium, niobium-molybdenum and niobium-molybdenum-titanium, an intermediate layer of a ductile niobium-titanium alloy, and a surface coating of a metal from the group consisting of aluminum and aluminum-11 w/o silicon.

References Cited by the Examiner

UNITED STATES PATENTS

| | | | |
|---|---|---|---|
| 2,754,204 | 7/56 | Jaffee et al. | 75—174 |
| 2,822,268 | 2/58 | Hix | 75—174 |
| 2,838,395 | 6/58 | Rhodin | 75—174 |
| 2,838,396 | 6/58 | Rhodin | 75—174 |

OTHER REFERENCES

Battelle Memorial Institute Abstracts Reactor Core Materials (1) November 1958, vol. 1, No. 4, pages 9 and 13, (2) March 1958, vol. 1, No. 1, page 33, (3) May 1959, No. 2, vol. 2, pages 11, 17 and 18.

BMI-923, July 7, 954, AEC.
BMI-934, Aug. 3, 1954, AEC.
BMI-1253, Feb. 1, 1958, AEC.
"Combustion," February 1956, pages, 41–45.
KAPL-1909, October 1957, AEC, pp. 9–12 in particular.

CARL D. QUARFORTH, *Primary Examiner.*

WILLIAM G. WILES, *Examiner.*